United States Patent
Ziefle et al.

(10) Patent No.: US 12,163,868 B2
(45) Date of Patent: Dec. 10, 2024

(54) METHOD FOR DETERMINING A DEGREE OF WEAR, DEVICE FOR DETERMINING A DEGREE OF WEAR, MACHINING DEVICE AND COMPUTER PROGRAM

(71) Applicant: HOMAG GMBH, Schopfloch (DE)

(72) Inventors: Samuel Ziefle, Wörnersberg (DE); Peter Dettling, Horb (DE); Ruven Weiss, Alpirsbach (DE)

(73) Assignee: HOMAG GmbH, Schopfloch (DE)

( * ) Notice: Subject to any disclaimer, the term of this patent is extended or adjusted under 35 U.S.C. 154(b) by 229 days.

(21) Appl. No.: 17/766,215

(22) PCT Filed: Oct. 2, 2020

(86) PCT No.: PCT/EP2020/077662
§ 371 (c)(1),
(2) Date: Apr. 1, 2022

(87) PCT Pub. No.: WO2021/064176
PCT Pub. Date: Apr. 8, 2021

(65) Prior Publication Data
US 2023/0168156 A1    Jun. 1, 2023

(30) Foreign Application Priority Data
Oct. 4, 2019    (DE) .................... 10 2019 126 764.1

(51) Int. Cl.
*B23Q 17/09*    (2006.01)
*G01L 5/00*    (2006.01)
*G01M 99/00*    (2011.01)

(52) U.S. Cl.
CPC ......... *G01M 99/005* (2013.01); *B23Q 17/098* (2013.01); *G01L 5/00* (2013.01); *B23Q 2717/00* (2013.01)

(58) Field of Classification Search
CPC ............... G01M 99/005; B23Q 17/098; B23Q 2717/00; B23Q 17/0957; G01L 5/00;
(Continued)

(56) References Cited

U.S. PATENT DOCUMENTS 4,332,161 A * 6/1982 Kakino .................... G01N 3/58
                                              73/104
4,744,242 A    5/1988 Anderson et al.
(Continued)

FOREIGN PATENT DOCUMENTS

DE    102014003844 A1    9/2014
JP      2006205350 A    8/2006

OTHER PUBLICATIONS

International Search Report of PCT/EP2020/077662 dated Jan. 21, 2021, 2 pages.
(Continued)

*Primary Examiner* — David J Bolduc
(74) *Attorney, Agent, or Firm* — Morgan, Lewis & Bockius LLP

(57) ABSTRACT

The invention relates to a method for determining the degree of wear of at least one component of a machining device (10), wherein at least one actual condition (19) of the machining device (10) is established and the at least one actual condition (19) is compared to at least one comparative condition (18) of the machining device (10), and a conclusion is drawn as to the degree of wear of the at least one component as a function of a deviation determined between the at least one actual condition (19) and the at least one comparative condition (18), wherein, to establish the at least one actual condition (19) and/or the at least one comparative condition (18), sound emissions (16) of the machining device (10) are captured. The invention also relates to a device (13) for determining a degree of wear of at least one component of a machining device (10), a machining device
(Continued)

Figure 1:
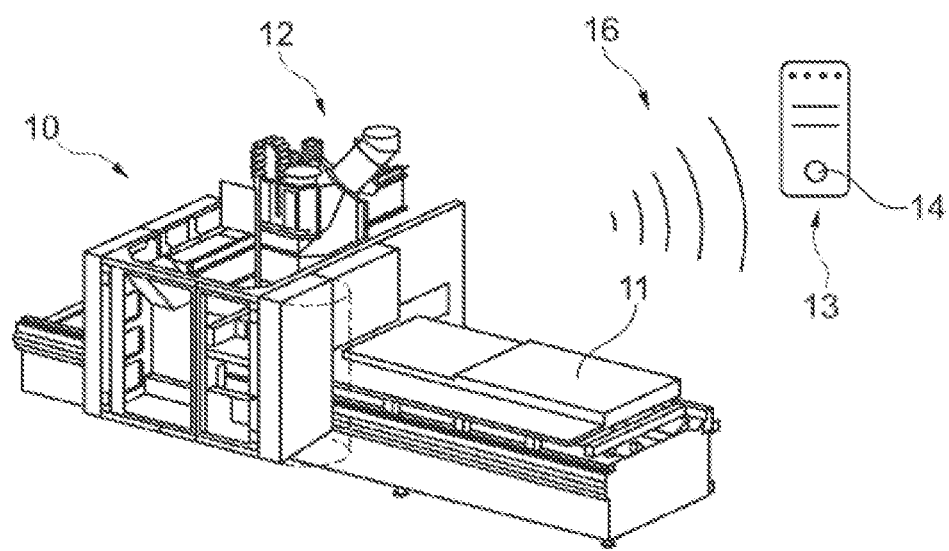

(10) for machining workpieces (11), and a computer program for determining a degree of wear of at least one component of a machining device (10).

17 Claims, 4 Drawing Sheets

(58) Field of Classification Search
CPC ..... G01N 2291/015; G01N 2291/0258; G01N 29/4436; G01N 29/4454; G01N 29/46; G01N 29/48; G01N 29/14
See application file for complete search history.

(56) References Cited

U.S. PATENT DOCUMENTS

| | | | | |
|---|---|---|---|---|
| 4,802,095 | A * | 1/1989 | Jeppsson | B23Q 17/09 73/104 |
| 4,831,365 | A * | 5/1989 | Thomas | B23Q 17/0961 73/104 |
| 7,092,786 | B2 | 8/2006 | Yasugi et al. | |
| 2006/0142893 | A1 * | 6/2006 | Yasugi | G05B 19/4065 702/182 |
| 2009/0282922 | A1 * | 11/2009 | Gerstenberg | G01N 29/46 73/606 |
| 2013/0253670 | A1 * | 9/2013 | Chung | B23Q 17/0961 700/79 |
| 2014/0195197 | A1 * | 7/2014 | Boerhout | H04W 52/0261 702/182 |
| 2017/0285626 | A1 | 10/2017 | Lavi et al. | |
| 2020/0219527 | A1 * | 7/2020 | Kogan | G05B 23/0221 |
| 2020/0356066 | A1 * | 11/2020 | Mennicken | G05B 19/0428 |

OTHER PUBLICATIONS

Second Office Action for Chinese Application No. 202080069522.0, dated Jul. 25, 2024, 20 pages including machine translation.

\* cited by examiner

METHOD FOR DETERMINING A DEGREE OF WEAR, DEVICE FOR DETERMINING A DEGREE OF WEAR, MACHINING DEVICE AND COMPUTER PROGRAM

The invention relates to a method for determining a degree of wear of at least one component of a machining device, a device for determining a degree of wear of at least one component of a machining device, and a machining device and a computer program for determining a degree of wear.

From DE 10 2014 104 581 A1, a method for monitoring a condition of a machining tool of a machining device is known. To evaluate the condition of the machining tool, the machining device comprises an optical recording device, which captures an optical image of an actual condition of the machining tool after a machining operation to compare this with an optical image of a desired condition of a comparative tool stored in a control device. If, by comparing the optical condition images, a defined deviation between the machining tool and the comparison tool is determined, a faulty condition of the machining tool is deduced. The evaluation of the condition of the machining tool requires an interruption of the machining operation since the optical capture of the machining tool is only possible in idle mode. Furthermore, the evaluation of the condition is limited to the optically captured region of the machining tool such that regions that are not optically captured are not taken into account in the evaluation. The optical components can furthermore become contaminated by the machining operation such that increased susceptibility to faults or even failure of the recording device can occur.

It is an object of the present invention to propose a method whereby a rapid and precise determination of a degree of wear of at least one component of a machining device is made possible. It is also an object of the invention to propose a device and a machining device whereby a degree of wear of at least one component of the machining device can be determined rapidly and precisely. In addition, it is an object of the invention to propose a computer program that allows a rapid and precise determination of a degree of wear of at least one component of a machining device.

This object is achieved by a method for determining a degree of wear of at least one component of a machining device, in which at least one actual condition of the machining device is established and the at least one actual condition is compared with at least one comparative condition of the machining device, and a conclusion is drawn as to the degree of wear of the at least one component as a function of a determined deviation between the at least one actual condition and the at least one comparative condition, wherein sound emissions of the machining device are captured to establish the at least one actual condition and/or the at least one comparative condition. By establishing the at least one actual condition and/or the at least one comparative condition by capturing sound emissions of the machining device, the degree of wear of the at least one component can be determined while the machining device is in operation. Continuous monitoring of the degree of wear while the machining device is in operation can also be made possible in this way.

The sound emissions can be, for example, structure-borne sound or airborne sound. If the sound emissions of the machining device are captured by an appropriate sensor device, for example by sound pressure sensors, microphones, structure-borne sound sensors or similar sensors, the degree of wear of the at least one component can also be established precisely based on the sound emissions. In addition to the sound emissions, further machine data can also be captured in order to establish the degree of wear. The machining device can be any machine tool for machining workpieces. The machining device can preferably be in the form of a wood-machining device for machining workpieces that consist at least partly of wood, wood materials, synthetic material, composite materials or the like.

In a preferred embodiment of the method, the at least one actual condition and/or the at least one comparative condition can be established from the sound emissions of the machining device captured during a machining operation. In this way, the degree of wear of the at least one component can be determined during the machining operation. Therefore, to evaluate the degree of wear, no interruption of the machining operation is necessary, and so shorter down times can be achieved in this way.

An advantageous development of the method can provide that at least one operating parameter of the at least one wearing component is determined from the captured sound emissions, preferably a sound pressure generated by the at least one component, and the at least one actual condition and/or the at least one comparative condition is established using the at least one operating parameter. Component-specific features can thus be determined from the captured sound emissions to determine the degree of wear of the at least one component. By establishing the at least one operating parameter as a sound pressure generated by the at least one component, these component-specific features can be determined based on acoustic properties of the at least one component.

A further preferred embodiment of the method can provide that the captured sound emissions of the machining device are converted to an amplitude spectrum or a frequency spectrum, and the at least one operating parameter is established using a defined frequency and/or a defined amplitude in the amplitude spectrum or in the frequency spectrum, and that the at least one actual condition or the at least one comparative condition is established using the defined frequency and/or amplitude. By converting the sound emissions to the amplitude spectrum or frequency spectrum, it is possible to visualize the different frequencies of which the captured sound emissions are composed. In this way, it is possible to assign the sound generated by the at least one component from the captured sound emissions.

In a particularly preferred embodiment of the method, the at least one operating parameter can be determined from the captured sound emissions as a tool-specific operating parameter of a machining tool of the machining device, preferably as a sound pressure generated by the machining tool. In this way, the degree of wear of the machining tool, for example a degree of sharpness of the machining tool or damage to the machining tool, can be determined from the sound emissions.

In an advantageous development of the method, the at least one tool-specific operating parameter can be determined from the captured sound emissions by establishing a gear mesh frequency $f_z$ of the machining tool and/or a harmonic of the gear mesh frequency $f_{z,i}$ of the machining tool. The gear mesh frequency and/or the harmonic of the gear mesh frequency can be established definitively as a function of the speed of the machining tool, the rotational frequency of the machining tool and/or a number of machining teeth of the machining tool. In this way, a definitive assignment of the frequencies of the sound generated by the machining tool can take place from the captured sound emissions.

Advantageously, the at least one tool-specific operating parameter can be established using the gear mesh frequency $f_z$ and/or the harmonic of the gear mesh frequency $f_{z,i}$ in the frequency spectrum or in the amplitude spectrum. In the amplitude spectrum or frequency spectrum, in connection with the determined gear mesh frequency and/or harmonic of the gear mesh frequency, a simple assignment of the frequencies of the sound generated by the machining tool can take place.

In a further preferred embodiment of the method, it can be provided that the at least one operating parameter is determined in a first time interval to establish the comparative condition, and the at least one operating parameter is determined in at least one further time interval to establish the at least one actual condition. The comparative condition and the at least one actual condition are thus captured with a time gap between them, thus allowing a degree of wear of the at least one component or of the machining tool occurring within the time gap to be determined. In particular in this case, a plurality of actual conditions can also be established with time gaps between them to allow an accurate evaluation of the degree of wear to be performed. The time gaps can be selected at will, thus permitting, for example, continuous monitoring of the degree of wear.

One embodiment of the method can provide that a sound pressure difference is established between the at least one operating parameter captured in the first time interval and the at least one operating parameter determined in the at least one further time interval to determine the deviation between the at least one actual condition and the at least one comparative condition. The sound pressure difference can therefore be established using a difference between an amplitude level of the actual condition and an amplitude level of the comparative condition. This sound pressure difference becomes greater with an increasing degree of wear.

A further embodiment of the method can provide that, to determine the deviation between the at least one actual condition and the at least one comparative condition, a difference is established between a defined frequency bandwidth of the amplitude of the at least one operating parameter captured in the first time interval and a defined (for example by calculation) frequency bandwidth of the amplitude of the at least one operating parameter determined in the at least one further time interval. In this way, a further feature can be established to determine the degree of wear of the at least one component or of the machining tool, this being provided by comparing defined frequency bandwidths of the comparative condition and of the at least one actual condition.

In a further development of the method, to establish the frequency bandwidth, a first mean value can be determined from a basic curve of the amplitude spectrum or frequency spectrum, and a second mean value can be determined taking into account the amplitude of the at least one operating parameter, and the frequency bandwidth can be defined by a frequency range of the amplitude in which the second mean value exceeds the first mean value. In this way, the frequency bandwidth of an amplitude can be determined in a defined manner, and thus a comparison of the frequency bandwidths between the comparative condition and the actual condition is made possible.

The method can further provide that the sum of all the frequency bandwidths of the operating parameters captured in the first time interval is established within a defined frequency range window, and the sum of all the frequency bandwidths of the operating parameters captured in the second time interval is established in an equivalent frequency range window, and the degree of wear of the at least one component, in particular of the machining tool, is determined using a difference between the sum of the frequency bandwidths of the operating parameters captured in the first time interval and the sum of the frequency bandwidths of the operating parameters captured in the second time interval.

The degree of wear of the at least one component or of the machining tool can also be determined by the method in that a torque transmitted by the machining device is captured during the machining operation and the degree of wear of the at least one component, in particular of the machining tool, is determined from a difference between the torque captured in the first time interval and the torque captured in the at least one further time interval. Apart from the degree of wear being determined from the sound emissions, the degree of wear can additionally be established by capturing the torque. This can allow both a more precise evaluation of the degree of wear and a check of the degree of wear determined using the sound emissions. In particular, the value of the effective current drawn by the machining device during the machining operation can be captured for this purpose.

The object is also solved by a device for determining a degree of wear of at least one component of a machining device, in particular of a machining tool of the machining device, comprising a sensor device for establishing at least one actual condition and/or at least one comparative condition of the machining device, and an computing device for determining a deviation between the at least one actual condition and the at least one comparative condition, wherein sound emissions of the machining device can be captured by the sensor device and a method according to one of the embodiments described above can be implemented by the computing device to determine the degree of wear. Using such a device, an evaluation of the degree of wear of the at least one component, in particular of the machining tool, can take place by capturing sound emissions of the machining device, thus allowing a simple and rapid determination of the degree of wear. In particular, this can be achieved by the fact that the degree of wear can be determined by the device during operation, in particular during a machining operation of the machining device. The device can additionally comprise a display device, whereby information relating to the degree of wear can be displayed. Based on the information displayed, a user can thus carry out or arrange for a replacement or repair of the at least one component. Likewise, by determining the degree of wear, for example when a wear limit is reached, an automatic replacement of a worn component, for example a blunt machining tool, can be triggered or a prompt automatic reorder of the component, of the machining tool or of any necessary consumable items can take place.

In an advantageous further development of the device, at least the computing device can be connectable to the machining device by way of an interface, or can be integrated into the machining device. For example, the device can also be part of a control device of the machining device.

In an alternative embodiment of the device, at least the computing device can be provided in a mobile terminal device, in particular in a mobile computer, tablet, smartphone or the like, and the sensor device can be connectable to the mobile terminal device or integrated into the mobile terminal device. A mobile terminal device of this type can be carried by the user, thus allowing flexible use independently of the machining device. As a result, the device can also capture sound emissions of other machining devices, for example, to determine a degree of wear of components, in particular of machining tools, of these machining devices.

The object is also achieved by a machining device for machining workpieces, said machining device having a sensor device for establishing at least one actual condition and/or at least one comparative condition of the machining device, and having an computing device for determining a deviation between the at least one actual condition and the at least one comparative condition in order to determine a degree of wear of at least one component of the machining device, wherein sound emissions of the machining device can be captured by the sensor device and a method according to one of the embodiments described above can be implemented by the computing device for determining the degree of wear. Such a machining device can be any machine tool having at least one machining tool for machining workpieces. These workpieces can be made of, for example, a metal, synthetic material or composite material, a stone material or another machinable material. The machining device is preferably in the form of a wood-machining device, by which workpieces made at least partly of wood, wood materials or the like are machinable.

In addition, the object is achieved by a computer program for determining a degree of wear of at least one component of a machining device, wherein a method according to one of the embodiments described above can be implemented for determining the degree of wear. Such a computer program can be stored on a machine-readable storage medium.

Figure 2:
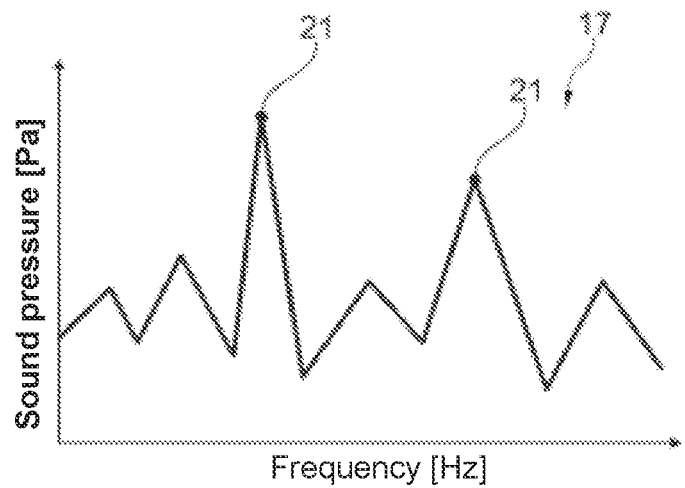
Figure 3:
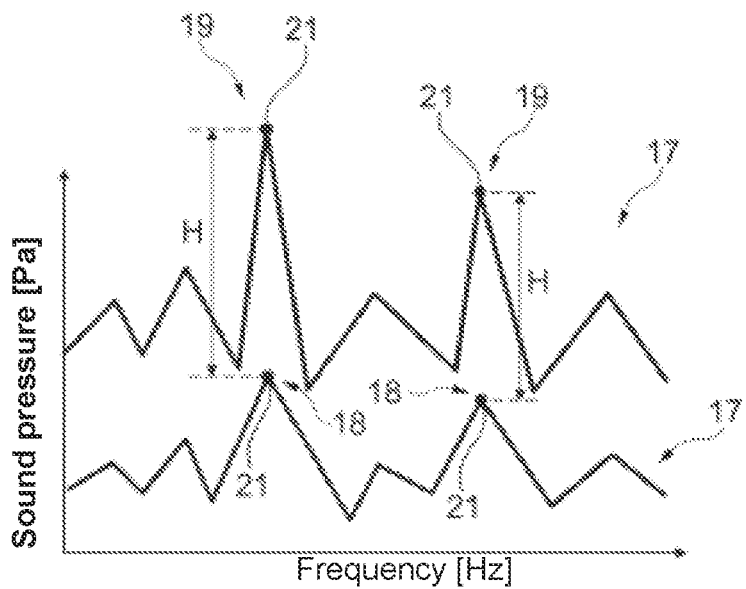
Figure 4:
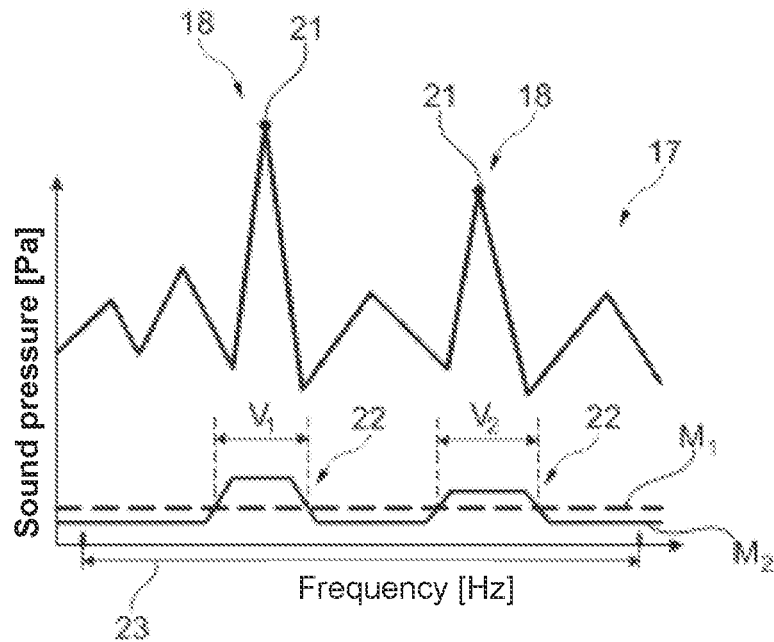
Figure 5:
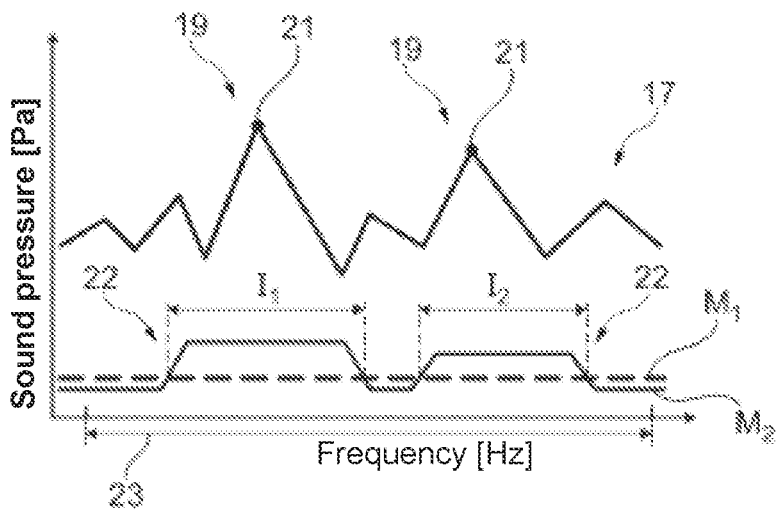
Figure 6:
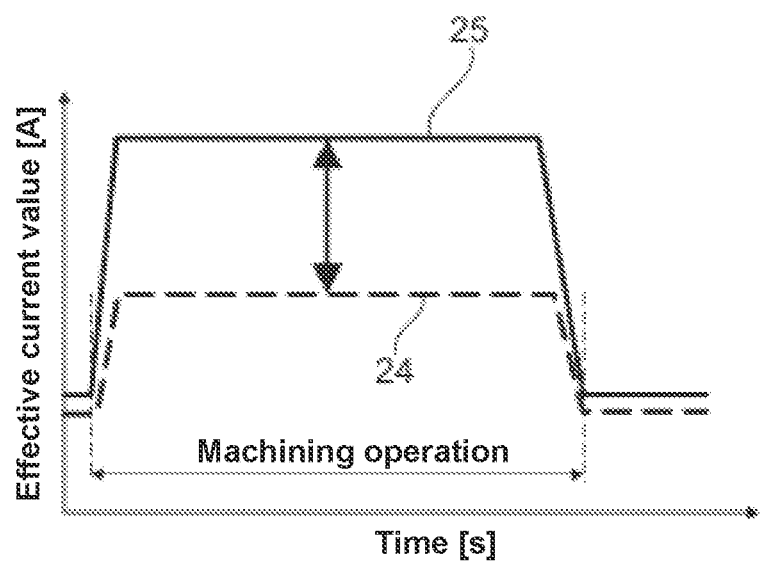

The invention as well as further advantageous embodiments and further developments thereof will be described and explained in more detail below based on the examples illustrated in the figures. The features to be derived from the description and the figures can be used according to the invention individually or in any combination of more than one thereof. The figures show the following:

FIG. 1 a schematic representation of an exemplary machining device with a device for determining a degree of wear, FIG. 2 a schematic representation of an amplitude spectrum of sound emissions of the machining device, FIG. 3 a schematic representation of the amplitude spectrum according to FIG. 2 of an actual condition and a comparative condition of the machining device, FIG. 4 a further schematic representation of the amplitude spectrum of the comparative condition of the machining device, FIG. 5 a further schematic representation of the amplitude spectrum of the actual condition of the machining device, and FIG. 6 a schematic representation of an effective-current-value/time diagram of the machining device.

FIG. 1 shows a schematic representation of a machining device 10. This machining device 10 can be any machine tool for machining workpieces 11. In particular, the machining device 10 can be in the form of a wood-machining device. The workpieces 11 to be machined are in particular workpieces 11 made at least partly of wood, wood materials, synthetic materials, composite materials or the like. These can be a wide variety of workpieces 11, for example solid wood or chipboard panels, lightweight panels, sandwich panels, skirting boards, profiles for profile wrapping and similar. However, the present invention is not limited to the machining of such workpieces 11 and materials. The machining device 10 can likewise be provided for machining workpieces 11 made of a metallic or any other material. The machining device 10 can be in the form of a CNC machining device 10 or can form a CNC machining center.

Alternatively, the machining device 10 can also be in the form of a continuous device and can allow the machining of workpieces 11 in a continuous process.

For machining the workpieces 11, the machining device 10 comprises at least one machining tool 12. This machining tool 12 can be in the form of, for example, a milling tool, sawing tool and/or drilling tool or the like. Machining of the workpiece 11 is therefore understood in particular to mean cutting to size, sawing, milling, drilling, grinding, planing or a comparable machining process on the workpiece 11 by the machining tool 12. The machining tool 12 preferably performs a periodic machining movement, for example a rotating movement or cutting movement, during a machining operation. For machining the workpieces 11, the machining tool 12 comprises in particular a tooth-like machining portion. This machining portion of the machining tool 12 is formed by a plurality of teeth.

The machining device 10 comprises a device 13 for determining a degree of wear of the at least one machining tool 12 of the machining device 10. The device 13 can likewise be provided for determining a degree of wear of another wearing component of the machining device 10. Accordingly, the degree of wear of the machining tool 12 below is also to be understood as including the degree of wear of a wearing component of the machining device 10.

The device 13 comprises a sensor device 14 for capturing sound emissions 16, and a computing device whereby the degree of wear of the machining tool 12 can be determined from the captured sound emissions 16. In particular the sound emissions 16 generated by the machining device 10 and/or by the machining operation are captured by the sensor device 14. The sound emissions 16 can be both structure-borne sound, which is generated by the machining device 10 and/or by the workpiece 11 being machined, and sound generated by components of the machining device 10, in particular by the machining tool 12. To determine the degree of wear, in particular the sound emissions 16 generated during the machining of the workpiece 11 are captured by the sensor device 14. In addition, to determine the degree of wear, further machine data are captured by the sensor device 14 and/or by an additional capture device. These further machine data are, for example, a speed of the machining tool 12, a feed rate of the workpiece 11 being machined and/or an electric current or electric power drawn by the machining device 10. The latter can be regarded as a measure of the transferred torque. Likewise, to determine the degree of wear, any other machine data that are directly or indirectly dependent on the degree of wear of the machining tool 12 can be captured by the sensor device 14 and/or capture device.

To capture the sound emissions 16, the sensor device 14 comprises one or more microphones. Likewise or alternatively, the sensor device 14 can also comprise any other sound pressure sensors for capturing the sound emissions 16, for example, contact microphones, structure-borne sound microphones or structure-borne sound pickups. The sensor device 14 can be either integrated into the device 13 or connectable to the device 13 by an interface.

The device 13 can be in the form of a separate or external unit, as shown in FIG. 1. This external device 13 can be connectable to the machining device 10, for example by a wired or wireless interface. The sensor device 14 can be integrated into this external device 13 or can be connectable thereto. This external device 13 can be in the form of, for example, a mobile terminal device, in particular a mobile computer, tablet, smartphone or the like. Likewise, the device 13 can also be in the form of a component of the machining device 10, for example the computing device of the device 13 can be integrated into a control device of the machining device 10.

A method can be carried out by the computing device whereby the degree of wear of the machining tool 12 can be determined. In this case, the degree of wear is determined based on the sound emissions 16 captured by the sensor device 14 and the further machine data captured.

To determine the degree of wear, the sound emissions 16 and the further machine data are captured in particular during the machining operation. The sound emissions 16 and the further machine data can also be captured continuously over a certain time period and then filtered with regard to the sound emissions 16 and machine data captured during the machining operation. A machining operation here is to be understood as the engagement of the machining tool 12 with the workpiece 11.

FIG. 2 shows the captured sound emissions 16 in a schematic representation of an amplitude spectrum 17. In this amplitude spectrum 17, the sound pressure of the sound emissions 16 is shown over the frequency. The amplitude spectrum 17 is determined by a Fourier transform of the sound emissions 16 and displays the composition of the sound emissions 16 over different frequencies. The amplitude spectrum 17 forms the value of a frequency spectrum of the sound emissions 16, and so in principle the degree of wear can also be determined according to the method described based on the frequency spectrum.

As shown in FIG. 3, by capturing the sound emissions 16 in a first time interval, a comparative condition 18 of the machining device 10 is established. This comparative condition 18 represents a low degree of wear of the machining tool 12. In particular, the comparative condition 18 corresponds to a high degree of sharpness of the machining tool 12; for example when the machining device is fitted with a new or sharp machining tool 12. The comparative condition 18 therefore represents a kind of desired condition of the machining tool 12.

By capturing the sound emissions 16 in a second time interval, an actual condition 19 of the machining device 10 is established. This actual condition 19 represents a higher degree of wear of the machining tool 12, for example after a certain period of use of the machining tool 12. After this period of use, the machining tool 12 shows signs of wear as a result of having performed a large number of machining operations on the workpiece 11. In particular, the actual condition 19 therefore corresponds to a lower degree of sharpness of the machining tool 12. Over the service life of the machining tool 12, a plurality of actual conditions 19 can also be established at a plurality of time intervals. Likewise, the actual condition 19 can also be established continuously during the machining operations in order to allow the degree of wear to be monitored continuously in this way.

The comparative condition 18 and the actual condition 19 are determined using at least one tool-specific operating parameter 21. In particular, the comparative condition 18 and the actual condition 19 are established using a plurality of tool-specific operating parameters 21, each of these tool-specific operating parameters 21 being established using a sound pressure generated by the machining tool 12 at a defined frequency.

To determine the tool-specific operating parameter 21, a gear mesh frequency $f_Z$ [Hz] of the machining tool 12 and/or a harmonic of the gear mesh frequency $f_{Z,i}$ [Hz] is determined from the further machine data. To this end, the rotational frequency $f_n$ [Hz] is first established from the speed n [min$^{-1}$] of the machining tool 12 during the machining operation:

$$f_n = n * \min/60 \text{ s}$$

The gear mesh frequency is then derived from the product of the rotational frequency $f_n$ [Hz] of the machining tool 12 during the machining operation and the number of teeth (actually engaging during rotation) z of the machining tool 12:

$$f_Z = z * f_n$$

The harmonic of the gear mesh frequency $f_{Z,i}$ [Hz] is determined from the product of the number of teeth z of the machining tool 12, the rotational frequency $f_n$ [Hz] and an integer multiple i of the gear mesh frequency:

$$f_{Z,i} = z * f_n * i$$

To establish the tool-specific operating parameter 21 in the amplitude spectrum 17, the calculated gear mesh frequency $f_Z$ [Hz] and/or the harmonic of the gear mesh frequency $f_{Z,i}$ [Hz] is assigned to the corresponding amplitudes in the amplitude spectrum 17, as shown in FIG. 3. The actual condition 19 and the comparative condition 18 are established using the relevant operating parameters 21, i.e. using the sound pressure generated by the machining tool 12 at a corresponding frequency.

The degree of wear of the machining tool 12 can be determined according to FIGS. 3 to 6 based on three wear-dependent features as described below. The degree of wear of the machining tool 12 can be determined from these wear-dependent features individually, all together or in any combination.

FIG. 3 shows a first amplitude spectrum 17, whereby the comparative condition 18 of the machining tool 12 is established, and a second amplitude spectrum 17, whereby the actual condition 19 of the machining tool 12 is established. The sound emissions 16 here are captured with the same boundary conditions. The two amplitude spectra 17 are not congruent.

To determine the degree of wear, the actual condition 19 and the comparative condition 18 are compared, with a conclusion being drawn as to the degree of wear of the machining tool 12 from the deviation between the actual condition 19 and the comparative condition 18. It can likewise be provided here that a plurality of actual conditions 19 are established in different time intervals, preferably in a plurality of time intervals over the service life of the machining tool 12, and these are each compared with the comparative condition 18 to determine the degree of wear of the machining tool 12.

The degree of wear of the machining tool 12 is determined using a difference H between an amplitude level of the operating parameter 21 of the comparative condition 18 and an amplitude level of the operating parameter 21 in the actual condition 19. With an increasing degree of wear of the machining tool 12, the difference H becomes greater. The difference H can be linked to a definable wear threshold so that when reaching this wear threshold, a limit wear of the machining tool 12 can be established.

FIGS. 4 and 5 show the determination of the degree of wear of the machining tool 12 based on defined frequency bandwidths $V_1$, $V_2$, $I_1$, $I_2$ of the amplitudes of the captured operating parameters 21. FIG. 4 is a schematic amplitude spectrum 17 of the captured sound emissions 16 of the comparative condition 18, i.e. in the first time interval, and FIG. 5 is a schematic amplitude spectrum 17 of the captured sound emissions of the actual condition 19, i.e. in the second time interval.

To determine the degree of wear, a deviation between the actual condition 19 and the comparative condition 18 is determined, this deviation being determined using a difference between the frequency bandwidths $V_1$, $V_2$ of the amplitudes of the operating parameters 21 captured in the first time interval and the frequency bandwidths $I_1$, $I_2$ of the amplitudes of the operating parameters 21 determined in the second time interval.

To establish the frequency bandwidths $V_1$, $V_2$, $I_1$, $I_2$, a first mean value $M_1$ and a second mean value $M_2$ are formed. The first mean value $M_1$ here is determined from a basic curve of the amplitude spectrum 17. The second mean value $M_2$ is determined taking into account the amplitudes of the operating parameters 21, and thus this second mean value $M_2$ exhibits local elevations 22 compared to the first mean value $M_1$. These local elevations 22 of the second mean value $M_2$ correspond to the amplitudes of the operating parameters 21 as shown in FIGS. 4 and 5.

The frequency bandwidth $V_1$, $V_2$, $I_1$, $I_2$ of the amplitudes is defined by a frequency range in the amplitude spectrum 17 in which the second mean value $M_2$ exceeds the first mean value $M_1$. An exceeding factor can be taken into account here, so that the frequency bandwidth $V_1$, $V_2$, $I_1$, $I_2$ of the amplitude is defined by a frequency range in which the second mean value $M_2$ exceeds the first mean value $M_1$ by this exceeding factor.

To determine the degree of wear, the determined frequency bandwidths $I_1$, $I_2$ of the actual condition 19 are compared with the determined frequency bandwidths $V_1$, $V_2$ of the comparative condition 18. If a deviation is determined, in particular if the frequency bandwidths $I_1$, $I_2$ of the actual condition 19 are wider than the frequency bandwidths $V_1$, V2 of the comparative condition 18, a conclusion can be drawn as to the degree of wear of the machining tool 12.

To this end, all the determined frequency bandwidths $I_1$, $I_2$ of the actual condition 19 within a defined frequency range window 23 are added together and a sum of the frequency bandwidths $I_1$, $I_2$ is formed. Likewise, the determined frequency bandwidths $V_1$, $V_2$ of the comparative condition 18 within this defined frequency range window 23 are added together and the sum of the frequency bandwidths $V_1$, $V_2$ is formed.

The degree of wear of the machining tool 12 is then determined from the difference between the sum of the frequency bandwidths $I_1$, $I_2$ of the actual condition 19 and the sum of the frequency bandwidths $V_1$, $V_2$ of the comparative condition 18, wherein when the frequency bandwidths $I_1$, $I_2$ in the actual condition 19 become larger than the frequency bandwidths $V_1$, $V_2$ in the comparative condition 18, an increasing degree of wear of the machining tool 12 is deduced. The frequency bandwidths $V_1$, $V_2$, $I_1$, $I_2$ can be linked to a definable frequency bandwidth threshold, such that when reaching this frequency bandwidth threshold, a limit wear of the machining tool 12 can be determined.

FIG. 6 is a diagram with two plots 24, 25 of a value of an effective current drawn by the machining device 10 (as a measure of the transferred torque) during the machining operation. The beginning and end of the machining operation are indicated in FIG. 6 by broken lines. The lower plot 24 here shows the value of the effective current drawn in the first time interval, in which the machining tool 12 has only a small degree of wear or none at all. The upper plot 25 shows the value of the effective current drawn by the machining device 12 in a second time interval after a period of use of the machining tool 12.

The value of the effective current drawn is directly related to the required torque that has to be applied to perform the machining operation on the workpiece 11. A machining tool 12 with a higher degree of wear requires a greater torque, and therefore a higher effective current value, than a machining tool 12 with a lower degree of wear. In this way, by comparing the value of the effective current drawn, a conclusion can be drawn as to the degree of wear of the machining tool 12. The degree of wear is established using a difference between the value of the effective current drawn by the machining device 10 in the first time interval and the value of the effective current drawn in the second time interval. By using a difference limit to define a limit wear, a worn machining tool 12 can be identified.

LIST OF REFERENCE NUMBERS

10. Machining device
11. Workpiece
12. Machining tool
13. Device
14. Sensor device
16. Sound emissions
17. Amplitude spectrum
18. Comparative condition
19. Actual condition
21. Operating parameter
22. Local elevation
23. Frequency range window
24. First effective-current-value plot
25. Second effective-current-value plot

The invention claimed is:

1. A method for determining a degree of wear of at least one component of a machining device, wherein at least one actual condition of the machining device is established and the at least one actual condition is compared with at least one comparative condition of the machining device and a conclusion is drawn as to the degree of wear of the at least one component as a function of a determined deviation between the at least one actual condition and the at least one comparative condition, wherein to establish the at least one actual condition and/or the at least one comparative condition, sound emissions of the machining device are captured, wherein at least one operating parameter of the at least one wearing component is determined from the captured sound emissions as a tool-specific operating parameter of a machining tool of the machining device, wherein the at least one tool-specific operating parameter is determined from the captured sound emissions by establishing a gear mesh frequency $f_z$ of the machining tool and/or a harmonic of the gear mesh frequency $f_{z,i}$ of the machining tool, and wherein the at least one actual condition and/or the at least one comparative condition being established using the at least one operating parameter.

2. The method according to claim 1, wherein the at least one actual condition and/or the at least one comparative condition is established from the sound emissions of the machining device captured during a machining operation.

3. The method according to claim 1, wherein the captured sound emissions comprise a sound pressure generated by the at least one component.

4. The method according to claim 3, wherein the captured sound emissions of the machining device are converted to an amplitude spectrum or a frequency spectrum, and the at least one operating parameter is established using a defined frequency and/or a defined amplitude in the amplitude spectrum or in the frequency spectrum, and in that the at least one actual condition and/or the at least one comparative condition is established using the defined frequency and/or amplitude.

5. The method according to claim 3, wherein the tool-specific operating parameter comprises a sound pressure generated by the machining tool.

6. The method according to claim 1, wherein the at least one tool-specific operating parameter is established using the gear mesh frequency $f_z$ and/or the harmonic of the gear mesh frequency $f_{z,i}$ in the amplitude spectrum or in the frequency spectrum.

7. The method according to claim 3, wherein to establish the comparative condition, the at least one operating parameter is determined in a first time interval, and to establish the at least one actual condition, the at least one operating parameter is determined in at least one further time interval.

8. The method according to claim 7, wherein to determine the deviation between the at least one actual condition and the at least one comparative condition, a sound pressure difference between the at least one operating parameter captured in the first time interval and the at least one operating parameter determined in the at least one further time interval is established.

9. The method according to claim 7, wherein to determine the deviation between the at least one actual condition and the at least one comparative condition, a difference between a defined frequency bandwidth of the amplitude of the at least one operating parameter captured in the first time interval and a defined frequency bandwidth of the amplitude of the at least one operating parameter determined in the at least one further time interval is established.

10. The method according to claim 9, wherein to establish the frequency bandwidths, a first mean value is determined from a basic curve of the amplitude spectrum or frequency spectrum, and a second mean value is determined taking into account the amplitude of the at least one operating parameter, and the frequency bandwidths is defined by a frequency range of the amplitude in which the second mean value exceeds the first mean value.

11. The method according to claim 10, wherein the sum of all frequency bandwidths of the operating parameters captured in the first time interval is established within a defined frequency range window, and the sum of all frequency bandwidths of the operating parameters captured in the second time interval is established in an equivalent frequency range window, and the degree of wear of the at least one component, in particular of the machining tool, is determined using a difference between the sum of the frequency bandwidths of the operating parameters captured in the first time interval and the sum of the frequency bandwidths of the operating parameters captured in the second time interval.

12. The method according to claim 1, wherein a torque transmitted by the machining device is captured during the machining operation and the degree of wear of the at least one component, in particular of the machining tool, is determined from a difference between the torque captured in the first time interval and the torque captured in the at least one further time interval.

13. A device for determining a degree of wear of at least one component of a machining device, in particular of a machining tool of the machining device, comprising a sensor device for establishing at least one actual condition and/or at least one comparative condition of the machining device, and an computing device for determining a deviation between the at least one actual condition and the at least one comparative condition, wherein sound emissions of the machining device can be captured by the sensor device, and a method according to claim 1 can be implemented by the computing device for determining the degree of wear.

14. The device according to claim 13, wherein at least the computing device is connectable to the machining device by way of an interface or is integrated into the machining device.

15. The device according to claim 13, wherein at least the computing device is provided in a mobile terminal device, in particular in a mobile computer, tablet, smartphone, and the sensor device is connectable to the mobile terminal device or is integrated into the mobile terminal device.

16. A machining device for machining workpieces, having a sensor device for establishing at least one actual condition (19) and/or at least one comparative condition of the machining device, and having an computing device for determining a deviation between the at least one actual condition and the at least one comparative condition in order to determine a degree of wear of at least one component of the machining device, wherein sound emissions of the machining device can be captured by the sensor device and a method according to claim 1 can be implemented by the computing device for determining the degree of wear.

17. A computer program for determining a degree of wear of at least one component of a machining device, wherein a method according to claim 1 can be implemented for determining the degree of wear.

* * * * *